(12) United States Patent
Abughazaleh et al.

(10) Patent No.: US 7,879,119 B2
(45) Date of Patent: Feb. 1, 2011

(54) HEAT INTEGRATION AND CONDENSATE TREATMENT IN A SHIFT FEED GAS SATURATOR

(75) Inventors: John Abughazaleh, Sugar Land, TX (US); Siva Ariyapadi, Pearland, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 640 days.

(21) Appl. No.: 11/831,338

(22) Filed: Jul. 31, 2007

(65) Prior Publication Data

US 2009/0019767 A1  Jan. 22, 2009

Related U.S. Application Data

(60) Provisional application No. 60/950,977, filed on Jul. 20, 2007.

(51) Int. Cl.
| | |
|---|---|
| C01B 3/36 | (2006.01) |
| C01B 3/02 | (2006.01) |
| C01B 3/24 | (2006.01) |
| C10J 3/46 | (2006.01) |
| B01J 7/00 | (2006.01) |
| H01M 8/06 | (2006.01) |

(52) U.S. Cl. .................. 48/197 R; 48/61; 423/648.1; 423/650

(58) Field of Classification Search ............ 48/61, 48/197 R
See application file for complete search history.

(56) References Cited

U.S. PATENT DOCUMENTS

| | | | |
|---|---|---|---|
| 3,971,639 A * | 7/1976 | Matthews ............... | 48/202 |
| 4,046,523 A | 9/1977 | Kalina et al. | |
| 4,161,393 A | 7/1979 | Rudolph et al. | |
| 4,230,556 A | 10/1980 | Carr et al. | |
| 4,244,706 A | 1/1981 | Forney et al. | |
| 4,391,611 A | 7/1983 | Haldipur et al. | |
| 4,411,670 A | 10/1983 | Marion et al. | |

(Continued)

FOREIGN PATENT DOCUMENTS

EP  0 634 470 A1  1/1995

(Continued)

OTHER PUBLICATIONS

"Coal Gasification Technologies," Jan. 2005, pp. 1-111, PERP 03/04S11, Nexant Inc.

(Continued)

*Primary Examiner*—Alexa D Neckel
*Assistant Examiner*—Matthew J Merkling
(74) *Attorney, Agent, or Firm*—KBR IP Legal

(57) ABSTRACT

Systems and processes for adjusting hydrogen content of a synthesis gas are provided. At least a portion of carbon monoxide in a syngas can be converted to carbon dioxide to provide a shifted syngas and condensed water. The syngas can have a first hydrogen to carbon monoxide ratio and a first temperature, and the shifted syngas can have a second hydrogen to carbon monoxide ratio and a second temperature, both greater than the first. Heat from the shifted syngas can be at least partially transferred from the shifted syngas to the condensed water to at least partially vaporize the condensed water. The syngas can be at least partially saturated with the at least partially vaporized condensed water. A ratio of the water vapor to syngas can be about 1.0 or less.

20 Claims, 3 Drawing Sheets

U.S. PATENT DOCUMENTS

| | | | |
|---|---|---|---|
| 4,476,683 A | 10/1984 | Shah et al. |
| 4,493,636 A | 1/1985 | Haldipur et al. |
| 4,681,603 A | 7/1987 | Spangler et al. |
| 5,392,594 A | 2/1995 | Moore et al. |
| 5,447,702 A | 9/1995 | Campbell et al. |
| 5,578,093 A | 11/1996 | Campbell et al. |
| 5,655,466 A | 8/1997 | Hulkkonen et al. |
| 5,685,138 A | 11/1997 | Rao et al. |
| 5,832,747 A | 11/1998 | Bassett et al. |
| 5,953,899 A | 9/1999 | Rao et al. |
| 6,054,043 A | 4/2000 | Simpson |
| 6,521,143 B1 | 2/2003 | Genkin et al. |
| 6,773,691 B2 | 8/2004 | Ramani et al. |
| 6,780,395 B2 | 8/2004 | Narayan |
| 6,802,178 B2 | 10/2004 | Sprouse et al. |
| 6,966,190 B2 | 11/2005 | Wylie |
| 2006/0096298 A1 | 5/2006 | Barnicki at al. |
| 2006/0149423 A1 | 7/2006 | Barnicki et al. |
| 2007/0129450 A1* | 6/2007 | Barnicki et al. ............. 518/704 |

OTHER PUBLICATIONS

Holt, Neville, "Gasification Process Selection—Trade-offs and Ironies," Electronic Power Research Institute Gasification Technologies Conference, Washington DC, Oct. 4-6, 2004, pp. 1-24.

Maurstad, Ola. "An Overview of Coal Based Integrated Gasification Combined Cycle (IGCC) Technology," Massachusetts Institute for Technolgy—Laboratory for Energy and the Environment, Sep. 2005, pp. 1-36, MIT LFEE 2005-002 WP.

\* cited by examiner

HEAT INTEGRATION AND CONDENSATE TREATMENT IN A SHIFT FEED GAS SATURATOR

CROSS-REFERENCE TO RELATED APPLICATIONS

This application claims priority to and benefit of U.S. Provisional Patent Application No. 60/950,977, filed on Jul. 20, 2007, which is incorporated by reference herein.

FIELD

The present embodiments generally relate to systems and processes for producing syngas and products made therefrom. More particularly, the present embodiments relate to systems and processes for heat integration and condensate treatment in a shift feed gas saturator.

BACKGROUND

Gasification is a high-temperature process usually conducted at elevated pressure that converts any carbon-containing material into a gas containing primarily carbon monoxide and hydrogen. Since this gas is often used for the synthesis of chemicals or synthetic hydrocarbon fuels, the gas is commonly known as "synthesis gas" or simply "syngas." Gasification adds value to low- or negative-value feeds by converting them to marketable products. Typical feeds to gasification include coal; petroleum-based materials such as crude oil, coke, and high-sulfur residues; gases; and various waste materials.

The three basic types of gasifiers are: fixed bed, fluidized bed and entrained flow. A fixed bed gasifier operates at relatively low temperature (425° C.-600° C.) and requires a lower amount of oxygen compared to the other two types of gasifiers; however, the process produces synthesis gas containing methane, tars and oils. The fluidized bed gasifier operates at moderate temperature (900° C.-1050° C.) and requires more oxygen. An entrained flow gasifier operates at much higher temperature (1250° C.-1600° C.) and requires significantly higher energy input, but the carbon conversion is greater compared to fixed bed and fluidized bed types.

In addition to a source of electricity and fuel, syngas can be used for a wide range of products. Largely due to its hydrogen and carbon content, syngas can be a valuable source for producing chemicals, fertilizers, and industrial gases. A typical hydrogen to carbon monoxide ratio (H2:CO) of syngas is about 1:1 or less.

Certain products derived from syngas, including Fischer-Tropsch liquids, ammonia, hydrogen gas, urea, fuel gas, etc., each requires different and varying amounts of hydrogen and carbon monoxide. In some cases, chemical manufacturers can change products by adjusting the hydrogen and carbon monoxide contents of the syngas feed. In the case of using syngas as a fuel, the hydrogen to carbon monoxide ratio of the syngas often needs to be adjusted to meet various, and often changing, governmental restrictions on carbon dioxide emissions, typically per megawatt (MW) of power that is exported.

A need, therefore, exists for a process to adjust efficiently the hydrogen content of syngas to efficiently produce fuel and/or chemical products. There is also a need for efficiently varying production from one finished product to another with minimal downtime and capital costs.

BRIEF DESCRIPTION OF THE DRAWINGS

So that the manner in which the above recited features of the present embodiments can be understood in detail, a more particular description of the invention, briefly summarized above, may be had by reference to embodiments, some of which are illustrated in the appended drawings. The appended drawings illustrate only typical embodiments and are therefore not to be considered limiting of its scope, for the inventions herein may admit to other equally effective embodiments.

The present embodiments are detailed below with reference to the listed Figures.

DETAILED DESCRIPTION OF THE EMBODIMENTS

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and processes for adjusting carbon monoxide and/or hydrogen content of a synthesis gas are provided. In at least one specific embodiment, at least a portion of carbon monoxide in a syngas can be converted to carbon dioxide to provide a shifted syngas and condensed water. The syngas can have a first hydrogen to carbon monoxide ratio and a first temperature, and the shifted syngas can have a second hydrogen to carbon monoxide ratio and a second temperature, the second greater than the first. Heat from the shifted syngas can be at least partially transferred from the shifted syngas to the condensed water to at least partially vaporize the condensed water. The syngas can be at least partially saturated with the at least partially vaporized condensed water. A ratio of the water vapor to syngas can be about 1.0 or less.

Figure 1:
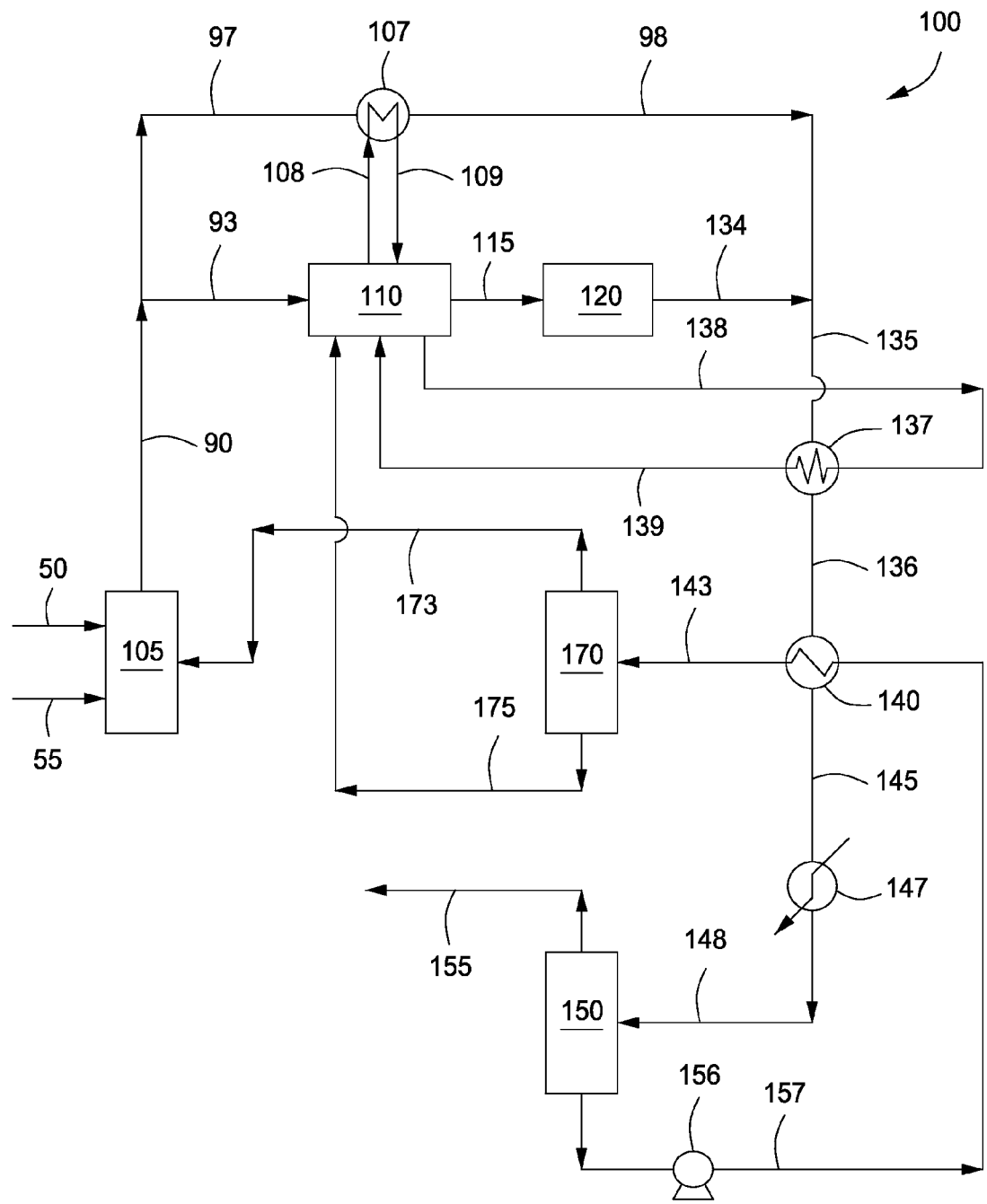
FIG. 1 depicts an illustrative system for producing syngas according to one or more embodiments.

With reference to the figures, FIG. 1 depicts an illustrative system 100 for producing syngas according to one or more embodiments. In one or more embodiments, one or more feedstocks via line 50 and one or more oxidants via line 55 can be introduced to one or more gasifiers 105 to produce a syngas via line 90. Any gasifier or gasification system 105 can be used, including slurry, slag, and transport types. In one or more embodiments, the gasifier 105 is a transport gasifier.

The syngas via line 90 can be selectively divided or otherwise selectively proportioned into at least a first portion via line 93 and a second portion via line 97. The first portion of the split syngas via line 93 can be introduced to one or more saturation units ("saturators") 110 where the relative humidity of the syngas can be increased using water and/or process condensate to provide an at least partially saturated syngas via line 115. The syngas via line 115 having been at least partially saturated can be introduced to one or more conversion units ("converters") 120 to provide an at least partially shifted syngas via line 134. The at least partially shifted syngas via line 134 can be combined or otherwise added to the second portion of the split syngas (line 97) that is not shifted in the conversion units 120, i.e. bypassed around the conversion units 120, to provide a product gas via line 135.

In one or more embodiments, the split of the syngas between the first line 93 and the second line 97 can be dependent upon a desired hydrogen to carbon monoxide ratio ("H2:CO ratio") in the product gas (line 135). For example, at least 20% vol, at least 40% vol, at least 60% vol, at least 80% vol, at least 99% vol, or all of the syngas via line 90 can be used to form the first line 93, the balance being used to form the second line 97. As explained in more detail below, only a portion of the syngas via line 90 that is split into the first line 93 is at least partially saturated and shifted and the balance via line 97 is not. As such, the amount of saturation can be reduced, resulting in a simpler system and significantly improved heat recovery.

In one or more embodiments, the H2:CO ratio in the syngas via line 90 can be about 0.4:1 to about 3:1, about 0.5:1 to about 3:1; or about 0.8:1 to about 3:1. In one or more embodiments, the H2:CO ratio in the syngas via line 90 can be about 0.4:1 to about 2.5:1, about 0.5:1 to about 2.4:1; or about 0.8:1 to about 1.5:1. In one or more embodiments, the syngas via line 90 can have a H2:CO of about 0.4:1 to about 0.8:1.

The syngas via line 90 can contain 85% or more carbon monoxide and hydrogen with the balance containing primarily carbon dioxide and methane. In one or more embodiments, the syngas can contain 90% or more carbon monoxide and hydrogen, 95% or more carbon monoxide and hydrogen, 97% or more carbon monoxide and hydrogen, or 99% or more carbon monoxide and hydrogen. In one or more embodiments, the carbon monoxide content of the syngas can range from a low of about 10% vol., 20% vol., or 30% vol. to a high of about 50% vol., 70% vol. or 85% vol. In one or more embodiments, the carbon monoxide content of the syngas can range from a low of about 15% vol., 25% vol., or 35% vol. to a high of about 65% vol., 75% vol. or 85% vol. In one or more embodiments, the hydrogen content of the syngas can range from a low of about 1 vol %, 5 vol %, or 10 vol % to a high of about 30 vol %, 40 vol % or 50 vol %. In one or more embodiments, the hydrogen content of the syngas can ranges from about 20 vol % to about 30 vol %. In one or more embodiments, the carbon dioxide content of the syngas is about 25% vol. or less, 20% vol. or less, 15% vol. or less, 10% vol. or less, 5% vol. or less, 3% vol. or less, 2% vol. or less, or 1% vol. or less. In one or more embodiments, the methane content of the syngas is about 15% vol. or less, 10% vol. or less, 5% vol. or less, 3% vol. or less, 2% vol. or less, or 1% vol. or less. In one or more embodiments, the water content of the syngas is about 40% vol. or less, 30% vol. or less, 25% vol. or less, 20% vol. or less, 15% vol. or less, 10% vol. or less, 5% vol. or less, 3% vol. or less, 2% vol. or less, or 1% vol. or less. In one or more embodiments, the syngas is nitrogen-free or essentially nitrogen-free, i.e. containing less than 0.5% vol. nitrogen. In one or more embodiments, the syngas can contain a maximum combined concentration of nitrogen, methane, carbon dioxide, water, hydrogen sulfide, and hydrogen chloride of less than 70 vol %, less than 60 vol %, less than 50 vol %, less than 40 vol %, less than 30 vol %, less than 25 vol %, less than 20%, less than 15%, less than 10%, less than 5%, or less than 1%.

In one or more embodiments, the temperature of the syngas via line 90 ("first temperature") can be about 100° F. to about 2,000° F., about 200° F. to about 1,800° F., about 300° F. to about 1,500° F., about 400° F. to about 1,000° F., or about 300° F. to about 600° F. In one or more embodiments, the pressure of the syngas via line 90 can be about 5 atm to about 300 atm, about 20 atm to about 200 atm, or about 50 atm to about 150 atm.

Within the saturators 110, the syngas can be mixed or otherwise combined with water and/or water vapor. The water can be from a fresh feed (not shown) to the saturator units 110 or the water can be process condensate from the system 100. In one or more embodiments, the water and/or water vapor provided to the saturator units 110 is derived from the process condensate within the system. As will be explained in more detail below, the water can serve as a heat transfer medium to conserve energy within the system 100, and can be used to at least partially saturate the syngas via line 90.

Each saturator 110 can be any system, device, equipment or collection of systems, devices or equipment suitable for humidifying syngas with water. In one or more embodiments, each 110 can be operated at a temperature sufficient to at least partially evaporate the water, thus contributing to the saturation of the syngas. In one or more embodiments, each saturator 110 can be operated at a temperature ranging from about 100° F. to about 1,000° F., about 250° F. to about 900° F., or about 400° F. to about 700° F. In one or more embodiments, each saturator 110 can be operated at a pressure ranging from about 5 atm to about 200 atm, from about 5 atm to about 100 atm, or about 5 atm to about 30 atm.

The at least partially saturated syngas via line 115 can have a relative humidity of at least 80% RH, at least 85% RH, at least 90% RH, at least 95% RH, or at least 99% RH. In one or more embodiments, the at least partially saturated syngas via line 115 can have a water vapor to syngas ratio of about 1.0 (based on volume). In one or more embodiments, the resulting syngas via line 115 can have a water vapor to syngas ratio ranging from a low of 0.1, 0.3, or 0.5 to a high of 0.8, 0.9, or 1.0. In one or more embodiments, the resulting syngas via line 115 can have a water vapor to syngas ratio of 1.0 or less, 0.9 or less, 0.8 or less, 0.7 or less, 0.6 or less, 0.5 or less, 0.4 or less, 0.3 or less, 0.2 or less, or 0.1 or less. In one or more embodiments, the temperature of the syngas via line 115 can be about 150° F. to about 650° F., about 200° F. to about 600° F., or about 300° F. to about 550° F. In one or more embodiments, the pressure of the syngas via line 115 can be about 5 atm to about 200 atm, from about 5 atm to about 100 atm, or about 5 atm to about 30 atm.

Within the one or more conversion units 120, a water-gas shift reaction can react at least a portion of the carbon monoxide in the syngas in the presence of a catalyst and/or a high temperature to produce hydrogen and carbon dioxide. In one or more embodiments, at least 10 vol % of the carbon monoxide in the syngas via line 115 can be shifted in the presence of water to provide hydrogen and carbon dioxide within the one or more conversion units 120. In one or more embodiments, at least 30 vol %, at least 50 vol %, at least 70 vol %, at least 90 vol %, at least 95 vol %, or at least 99 vol % of the carbon monoxide in the syngas via line 115 can be shifted to carbon dioxide within the one or more conversion units 120.

The H2:CO ratio of the at least partially shifted syngas exiting the one or more conversion units 120 (via line 134) can be greater than the H2:CO ratio of the syngas entering the one or more conversion units 120 (via line 115). In one or more embodiments, the H2:CO ratio ("first hydrogen to carbon monoxide ratio") of the syngas entering the one or more conversion units 120 (via line 115) can be about 0.4:1 to about 3:1, about 0.5:1 to about 3:1; or about 0.8:1 to about 3:1. In one or more embodiments, the first hydrogen to carbon monoxide ratio can be about 0.4:1 to about 2.5:1, about 0.5:1 to about 2.4:1; or about 0.8:1 to about 1.5:1. In one or more embodiments, the first hydrogen to carbon monoxide ratio can be about 0.4:1 to about 0.8:1.

In one or more embodiments, the H2:CO ratio ("second hydrogen to carbon monoxide ratio") of the syngas exiting the one or more conversion units 120 (via line 134) can be about 1:1 or greater than 1:1. In one or more embodiments, the second hydrogen to carbon monoxide ratio can be about 1:1 to about 200:1, about 2:1 to about 100:1, or about 3:1 to about 70:1. In one or more embodiments, the second hydrogen to carbon monoxide ratio can be about 3:1 to about 8:1.

Each conversion unit 120 can include, but are not limited to, single stage adiabatic fixed bed reactors; multiple-stage adiabatic fixed bed reactors with interstage cooling, steam generation or cold quench reactors; tubular fixed bed reactors with steam generation or cooling; fluidized bed reactors, or any combination thereof. In one or more embodiments, a sorption enhanced water-gas shift (SEWGS) process, utilizing a pressure swing adsorption unit having multiple fixed bed reactors packed with shift catalyst and high temperature (around 900° F.) carbon dioxide adsorbent, can be used. Various shift catalysts can be employed.

In at least one specific embodiment, each conversion unit 120 can include one or more high-temperature shift converters, one or more medium-temperature shift converters, and one or more low temperature shift converters. In one or more embodiments, the high temperature shift converter can be operated at a temperature from about 600° F. to about 1,000° F. using a catalyst such as iron oxide, zinc ferrite, magnetite, chromium oxides, mixtures thereof, derivatives thereof, or combinations thereof. In one or more embodiments, the medium temperature shift converter can be operated at a temperature from about 500° F. to about 700° F. using a catalyst such as iron oxide, chromium oxide, mixtures thereof, derivatives thereof, or combinations thereof. In one or more embodiments, the low temperature shift converter can be operated at a temperature from about 350° F. to about 430° F. In one or more embodiments, the catalyst in the low temperature shift converter can include, but is not limited to, copper, zinc, copper promoted chromium, derivatives thereof, or any combination thereof.

In at least one other specific embodiment, each conversion unit 120 can include two reactors arranged in series. A first reactor can be operated at high temperature (about 650° F. to about 750° F.) to convert a majority of the carbon monoxide present in the syngas in line 115 to carbon dioxide at a relatively high reaction rate using an iron-chrome catalyst. A second reactor can be operated at a relatively low temperature (about 300° F. to about 400° F.) to complete the conversion of carbon monoxide to carbon dioxide using a mixture of copper oxide and zinc oxide. In at least one other specific embodiment above or elsewhere herein, each conversion unit 120 can include one or more sour shift reactors utilizing a cobalt/molybdenum/alumina catalyst.

Although not shown, the recovered carbon dioxide from the conversion unit 120 can be used in a fuel recovery process to enhance the recovery of oil and gas. In an illustrative oil recovery process, carbon dioxide can be injected and flushed into an area beneath an existing well where "stranded" oil exists. The water and carbon dioxide removed with the crude oil can then be separated and recycled.

In one or more embodiments, the hydrogen concentration of the syngas via line 134 can range from about 15 mol % to about 80 mol %, about 25 mol % to about 70 mol %, or about 40 mol % to about 60 mol %. In one or more embodiments, the carbon monoxide concentration of the syngas via line 134 can range from about 0.1 mol % to about 10 mol %, about 0.3 mol % to about 8 mol % or about 0.5 mol % to about 5 mol %. In one or more embodiments, the carbon dioxide concentration of the syngas via line 134 can range from about 20 mol % to about 80 mol %, about 30 mol % to about 70 mol %, or about 40 mol % to about 60 mol %.

In one or more embodiments, condensate via line 108 from the saturator 110 can be at least partially vaporized with heat exchanged from the second portion of the syngas via line 97 within one or more heat exchangers 107. The at least partially vaporized condensate can be returned to the saturators via line 109. The cooled syngas exiting the one or more heat exchangers 107 via line 98 can be added or otherwise combined with the at least partially shift syngas via line 134 to provide syngas via line 135.

In one or more embodiments, the temperature of the syngas via line 135 ("second temperature") can be about 150° F. to about 1,000° F., about 200° F. to about 700° F., or about 300° F. to about 600° F. In one or more embodiments, the syngas via line 135 can be cooled using one or more heat exchangers 137 to provide a cooled syngas via line 136. In one or more embodiments, condensate via line 138 from the saturation unit 110 can be at least partially vaporized against the syngas via line 135 within the heat exchanger 137. The at least partially vaporized condensate can be returned to the saturation unit 110 via line 139.

The syngas via line 136 can be further cooled within one or more heat exchangers 140 against the process condensate. In one or more embodiments, water in the syngas via line 136 can be condensed and separated from the syngas using one or more coolers 147. The condensate and syngas via line 145 can be further cooled using one or more trim coolers 147, depending on process requirements. The heat transfer medium to the trim cooler(s) 147 can be cooling water or the like. The further cooled syngas having condensed water therein can exit the one or more trim coolers 147 via line 148, and can be collected in one or more separators 150 where the condensate can be separated from the gas and directed to the one or more heat exchangers 140 via line 157. The heated condensate exiting the one or more heat exchangers 140 via line 143 can be collected in one or more flash drums 170. One or more pumps 156, if needed, can be used to convey the condensate via line 157 through the heat exchanger(s) 140 and to the one or more flush drums 170.

Within the one or more heat exchangers 140, the condensate via line 157 can be at least partially vaporized, if not completely vaporized. In one or more embodiments, the condensate via line 157 is at least 50% vaporized. In one or more embodiments, the condensate via line 157 is at least 80% vaporized. In one or more embodiments, the condensate via line 157 is at least 80% vaporized or at least 90% vaporized, or at least 95% vaporized, or at least 99% vaporized. In one or more embodiments, the temperature of the syngas via 145 exiting the heat exchanger 140 can be about 100° F. to about 500° F., about 150° F. to about 400° F., or about 200° F. to about 300° F.

In one or more embodiments, the one or more heat exchangers 137, 140, 147 can be any system, device, equipment or collection of one or more systems, devices or equipment suitable for cooling a gas. For example, the heat exchangers 140, 147, and any other heat exchanger mentioned herein, can be a shell and tube type, plate and frame, fin-fan, air blower, quench column, or any combination thereof.

In one or more embodiments, the one or more heat exchangers 140 can be operated at a temperature of about 100° F. to about 1,000° F., about 150° F. to about 600° F., or about 200° F. to about 500° F. In one or more embodiments, the one or more heat exchangers 140, 147 can be operated at a pressure of about 1 atm to about 100 atm, from about 5 atm to about 75 atm, or about 10 atm to about 50 atm.

The one or more separators 150 can be operated at a temperature and pressure sufficient to separate the syngas via line 155 from the condensate. For example, each separator 150 can be operated at a temperature of about 100° F. to about 500° F., about 150° F. to about 400° F., or about 200° F. to about 300° F. In one or more embodiments, each separator 150 can be operated at a pressure of about 5 atm to about 200 atm, from about 5 atm to about 100 atm, or about 5 atm to about 50 atm. The condensate can be returned to the heat exchanger(s) 140 via line 157.

Each separator 150 can be any system, device, equipment or collection of one or more systems, devices or equipment suitable for separating gas from condensate. In one or more embodiments, each separator 150 can include one or more multi-staged separators having alternate segmental baffle trays, packing, perforated trays or the like, or combinations thereof. In one or more embodiments, each separator 150 can be a partially or completely open vessel, without internals.

As mentioned above, the condensate via line 157 can be directed, and pumped via pump 156 if needed, to the one or more heat exchangers 140 to cool or otherwise remove heat from the incoming syngas via line 136. The condensate can exit the one or more heat exchangers 140 via line 143. In one or more embodiments, the condensate via line 143 can be introduced to one or more flash drums 170 to flash or otherwise remove any volatiles via line 173 from the condensate. The volatiles can include one or more sour gases such as ammonia, methanol carbon dioxide, and sulfur-containing compounds, and can be returned to the gasifier 105 for disposal.

In one or more embodiments, the pressure of the water in line 143 can be rapidly reduced in the one or more flash drums 170 to provide degassed condensate via line 175 and one or more volatiles via line 173. In one or more embodiments, the volatiles can include, but are not limited to, hydrogen sulfide, hydrogen cyamide, hydrogen chloride, ammonia and light hydrocarbons. The volatiles via line 173 can be recycled or otherwise directed to the gasifier 105 for disposal.

In one or more embodiments, the volatiles can be separated from the recycled condensate at a pressure greater than the operating pressure of the gasifier 105. Accordingly, the separated volatiles can be returned to the gasifier(s) 200 and the recovered condensate can be returned to the saturator(s) 110 without needing to boost pressure. Accordingly, the system 100 can internally dispose of any unexpected volatiles, eliminating a source of pollution and greatly reducing the capital cost of equipment associated with recovering the volatiles from the condensate and recycling the condensate.

In one or more embodiments, the hydrogen sulfide concentration, if present, in the volatiles via line 173 can be about 0.1% vol to about 5% vol, 0.2% vol to about 4% vol, or about 0.5% vol to about 3% vol. In one or more embodiments, the hydrogen chloride concentration, if present, in the volatiles via line 173 can be about 0.1% vol to about 5% vol, 0.2% vol to about 4% vol, or about 0.5% vol to about 3% vol. In one or more embodiments, the hydrogen cyamide concentration, if present, in the volatiles via line 173 can be about 0.1% vol to about 5% vol, 0.2% vol to about 4% vol, or about 0.5% vol to about 3% vol. In one or more embodiments, the ammonia concentration, if present, in the volatiles via line 173 can be about 0.1% vol to about 20% vol, 0.2% vol to about 15% vol, about 0.5% vol to about 3% vol, or about 2% vol to about 10% vol. In one or more embodiments, the light hydrocarbon concentration, if present, in the volatiles via line 173 can be about 0.1% vol to about 5% vol, 0.2% vol to about 4% vol, or about 0.5% vol to about 3% vol.

Considering the one or more oxidants via line 55 in more detail, the one or more oxidants can include, but are not limited to: air; oxygen; essentially oxygen; oxygen-enriched air; mixtures of oxygen and air; mixtures of oxygen and inert gas such as nitrogen and argon; and the like. In one or more embodiments, the oxidant can contain about 65% vol. oxygen or more, or about 70% vol. oxygen or more, or about 75% vol. oxygen or more, or about 80% vol. oxygen or more, or about 85% vol. oxygen or more, or about 90% vol. oxygen or more, or about 95% vol. oxygen or more, or about 99% vol. oxygen or more. As used herein, the term "essentially oxygen" refers to an oxygen line containing 51% vol. oxygen or more. As used herein, the term "oxygen-enriched air" refers to air containing 21% vol. oxygen or more. Oxygen-enriched air can be obtained, for example, using separation processes such as cryogenic distillation of air, pressure swing adsorption, membrane separation or any combination thereof.

In one or more embodiments, the oxidant can be nitrogen-free or essentially nitrogen-free. By "essentially nitrogen-free," it is meant that the oxidant contains about 5% vol. nitrogen or less, 4% vol. nitrogen or less, 3% vol. nitrogen or less, 2% vol. nitrogen or less, or 1% vol. nitrogen or less.

The term "feedstock" as used herein with reference to line 50 refers to a raw material, whether solid, gas or liquid. For example, the feedstock can include one or more carbonaceous materials. In one or more embodiments, the carbonaceous materials can include, but are not limited to, biomass (i.e., plant and/or animal matter or plant and/or animal derived matter); coal (high-sodium and low-sodium lignite, lignite, sub-bituminous, and/or anthracite, for example); oil shale; coke; tar; asphaltenes; low ash or no ash polymers; hydrocarbon-based polymeric materials; biomass derived material; or by-product derived from manufacturing operations. The hydrocarbon-based polymeric materials can include, for example, thermoplastics, elastomers, rubbers, including polypropylenes, polyethylenes, polystyrenes, including other polyolefins, homo polymers, copolymers, block copolymers, and blends thereof, PET (polyethylene terephthalate), poly blends, poly-hydrocarbons containing oxygen; heavy hydrocarbon sludge and bottoms products from petroleum refineries and petrochemical plants such as hydrocarbon waxes; blends thereof, derivatives thereof, and combinations thereof.

In one or more embodiments, the feedstock can include a mixture or combination of two or more carbonaceous materials (i.e. carbon-containing materials). In one or more embodiments, the feedstock can include a mixture or combination of two or more low ash or no ash polymers, biomass derived materials, or by-products derived from manufacturing operations. In one or more embodiments, the feedstock can include one or more carbonaceous materials combined with one or more discarded consumer products, such as carpet and/or plastic automotive parts/components including bumpers and dashboards. Such discarded consumer products are preferably suitably reduced in size to fit within the gasifier 105. In one or more embodiments, the feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

In one or more embodiments, the feedstock can be a dry feed or conveyed to the gasifier 105 as a slurry or suspension. In one or more embodiments, the feedstock can be dried, for example to 18% moisture, and then pulverized by milling units such as one or more parallel bowl mills prior to feeding to the gasifier 105. In one or more embodiments, the feedstock can have an average particle diameter size of from about 50 μm to about 500 μm, or from about 50 μm to about 400 μm. In one or more embodiments, the average particle diameter size of the feedstock can range from about 150 μm to about 450 μm, or from about 250 μm to about 400 μm.

Figure 2:
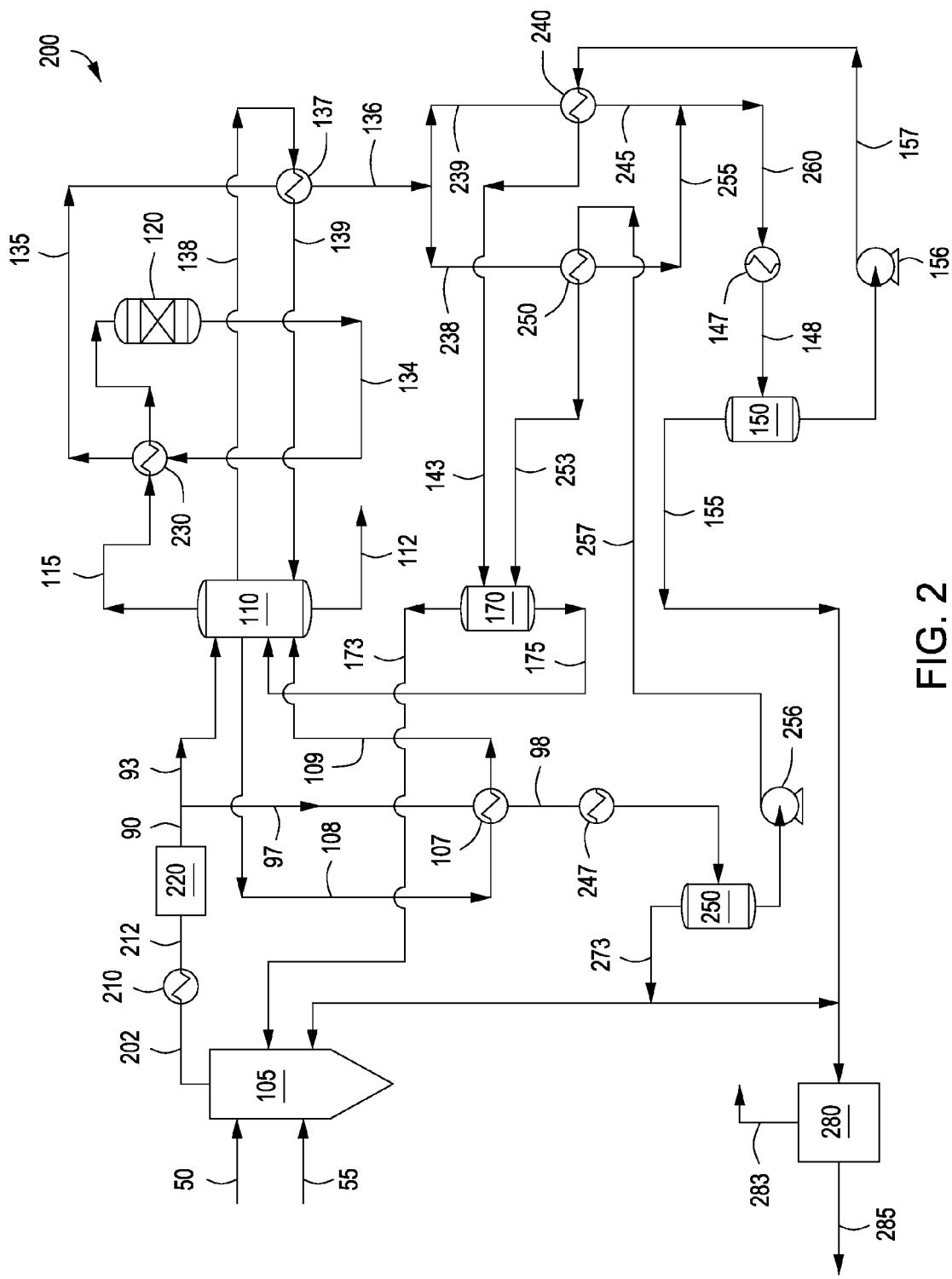
FIG. 2 depicts another illustrative system for producing syngas according to one or more embodiments.

FIG. 2 depicts another illustrative system 200 for producing syngas according to one or more embodiments. In addition to the system 100 described above with reference to FIG. 1, the system 200 can further include one or more coolers 210 to cool the syngas exiting the gasifier 105. For example, the syngas exiting the gasifier 105 via line 202 can be cooled to about 1,000° F. or less. In one or more embodiments, the syngas can be cooled to about 900° F. or less, 800° F. or less, 700° F. or less, 600° F. or less, 500° F. or less, 400° F. or less, or 300° F. or less. The cooled syngas via line 212 can then pass through one or more particulate removal systems 220 to further remove any remaining solids in the gas to provide a particulate free or nearly particulate free syngas via line 90.

In one or more embodiments, cooling the syngas exiting the gasifier 105 prior to the one or more particulate removal systems 220 is optional. For example, the syngas via line 202 can be fed directly to the particulate removal systems 220, resulting in warm gas particulate removal (e.g. 300° F.-1,000° F.).

The one or more particulate removal systems 220 can include one or more separation devices such as conventional disengagers and/or cyclones (not shown). Particulate control devices ("PCD") capable of providing an outlet particulate concentration below the detectable limit of about 0.1 ppmw can also be used. Illustrative PCDs can include but are not limited to sintered metal filters, metal filter candles, and/or ceramic filter candles (for example, iron aluminide filter material). The solid particulates from the particulate removal system 220 can be recycled to the gasifier 105 (not shown) or purged from the system.

As mentioned above, the syngas via line 90 can be selectively divided or otherwise selectively proportioned into at least two portions, e.g. the first portion via line 93 and the second portion via line 97. The first portion via the line 93 can be introduced to the saturators 110 where the relative humidity of the syngas can be increased using water and/or process condensate to provide an at least partially saturated syngas via line 115. The syngas via line 115 having been at least partially saturated with water can be introduced to one or more conversion units ("converters") 120 to provide an at least partially shifted syngas via line 134. Heat from the at least partially shifted syngas via line 134 can be transferred to the at least partially saturated syngas via line 115 to pre-heat the syngas in line 115 within one or more heat exchangers 230 prior to the converters 120. The at least partially shifted syngas can exit the heat exchanger 230 via line 135.

In one or more embodiments, the temperature of the syngas via line 135 ("second temperature") can be about 150° F. to about 1,000° F., about 200° F. to about 700° F., or about 300° F. to about 600° F. The syngas via line 135 can be cooled using the one or more heat exchangers 137 to provide a cooled syngas via line 136. The condensate via line 138 from the saturation unit 110 can be at least partially vaporized against the syngas via line 135 within the heat exchanger 137, and the at least partially vaporized condensate can be returned to the saturation unit 110 via line 139. As will be explained in more detail below, the cooled syngas via line 136 can be split or proportioned to further enhance heat and condensate recovery of the system 200.

Still referring to FIG. 2, the syngas via line 90 can have a temperature ranging from about 212° F. to about 1500° F. depending on process conditions within the gasifier 105 and depending whether the optional cooler 210 is used to cool the syngas from the gasifier 105. In either case, heat from the syngas can be captured via exchanger 107 and transferred to the saturator 110 via lines 108 and 109. The syngas exiting the exchanger 107 via line 98 can be furthered cooled via one or more coolers 247, and directed to one or more separators 250 where water in the syngas stream can be condensed and pumped via line 257 using one or more pumps 256 to the flash drum 170. The syngas from the separator 250 can be returned to the gasifier via line 273 or directed to an acid gas removal system 280 to remove any acid gases and/or contaminants therefrom via line 283 to provide a product syngas via line 285. Illustrative acid gases can include, but are not limited to, carbon dioxide and one or more sulfur-containing compounds such as hydrogen sulfide.

As mentioned above, the partially cooled and shifted syngas via line 136 can be selectively divided or otherwise selectively proportioned into at least a first portion via line 238 and a second portion via line 239. The syngas within line 238 can be used to heat the process condensate via line 257 within one or more heat exchangers 250 while the syngas within line 239 can be used to heat the process condensate via line 157 within one or more heat exchangers 240. The first portion of syngas exiting the exchanger 250 via line 255 can be combined with the second portion of syngas exiting the exchanger 240 via line 245 to form a re-combined syngas stream via line 260. The re-combined syngas via line 260 can be further cooled in the trim cooler 147 and directed to the one or more separators 150 where the condensate can be separated from the gas and directed to the heat exchangers 240 via line 157 and pump 156. The syngas via line 155 can be further treated using the one or more treatment units 280 or directed to the gasifier 105 via line 273.

The heated condensate via lines 143, 253 from the heat exchangers 240, 250 can be collected in the flash drum 170. The degassed condensate via line 175 can be sent to the saturator 110 and the volatiles via line 173 can be recycled or otherwise directed to the gasifier 105 for disposal, as explained above with reference to FIG. 1.

The one or more acid gas recovery units 280 can be used to remove and/or recover sulfur, carbon dioxide and other contaminants from the syngas. Illustrative catalytic acid gas recovery units 280 can include, but are not limited to, systems using zinc titanate, zinc ferrite, tin oxide, zinc oxide, iron oxide, copper oxide, cerium oxide, mixtures thereof, or combinations thereof. Illustrative process-based acid gas recovery units 280 can include, but are not limited to, the Selexol™ process, the Rectisol® process, the CrystaSulf® process, and the Sulfinol® Gas Treatment Process.

In one or more embodiments, one or more amine solvents such as methyl-diethanolamine (MDEA) can be used to remove any acid gas. Physical solvents such as Selexol (dimethyl ethers of polyethylene glycol) or Rectisol® (cold methanol), can also be used. If the syngas contains carbonyl sulfide (COS), the carbonyl sulfide can be converted by hydrolysis to hydrogen sulfide by reaction with water over a catalyst and then absorbed using the methods described above. If the syngas contains mercury, the mercury can be removed using a bed of sulfur-impregnated activated carbon.

Figure 3:
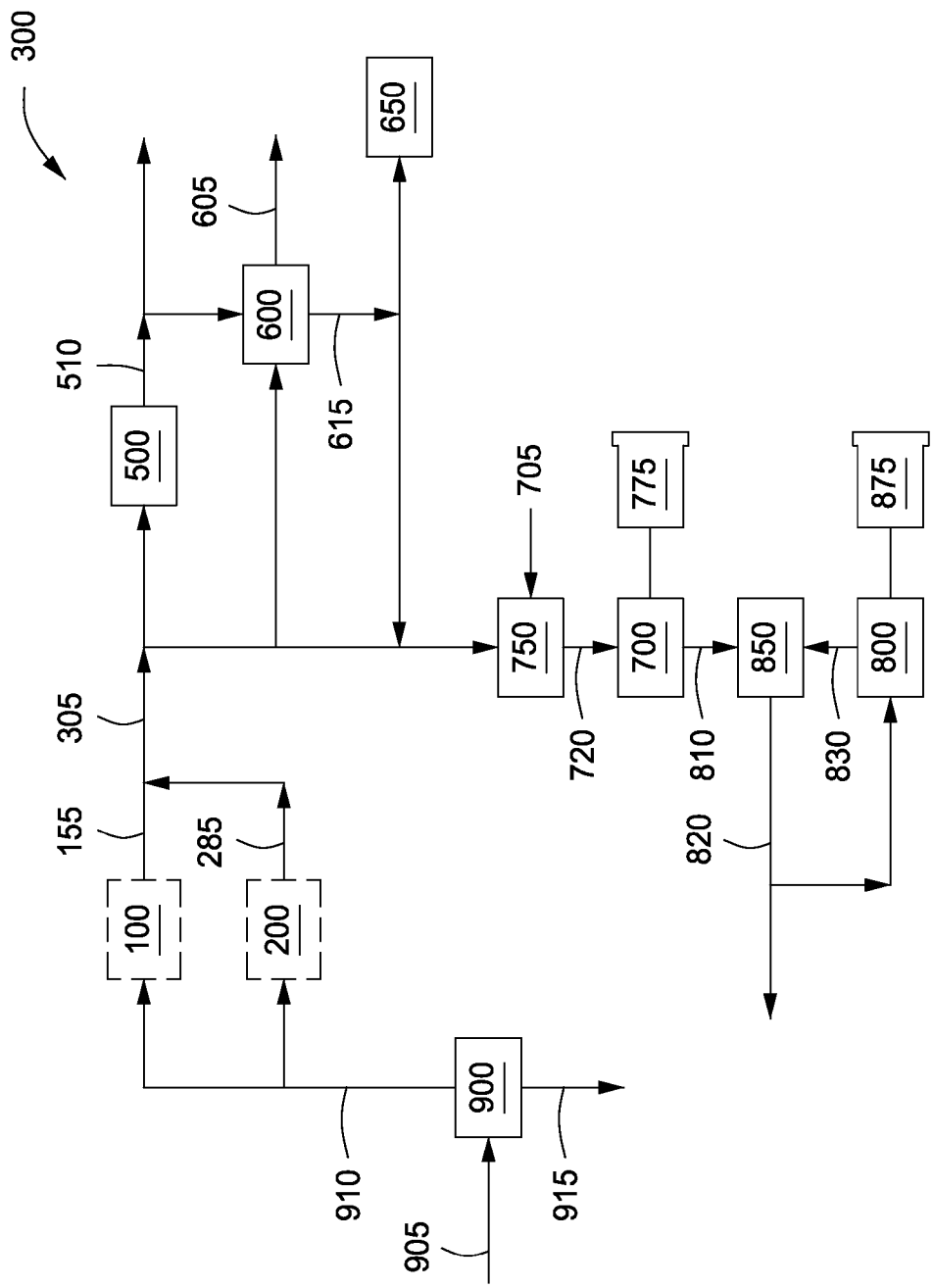
FIG. 3 depicts yet another illustrative system for producing syngas according to one or more embodiments.

FIG. 3 depicts yet another illustrative system 300 for producing syngas and uses therefrom according to one or more embodiments. In one or more embodiments, the syngas via line 155 from the system 100 described with reference to FIG. 1, and/or the syngas via line 285 from the system 200 described with reference to FIG. 2 can be further treated to provide one or more chemicals, feedstocks, fuel, power, or any combinations therefrom. In one or more embodiments, the system 300 can include one or more gas converters 500 to produce one or more Fischer-Tropsch products, ammonia, methanol, other chemical feedstocks, derivatives thereof, and/or combinations thereof, from the syngas. In one or more embodiments, the system 300 can also include one or more hydrogen separators 600, fuel cells 650, gas turbines 700, combustors 750, steam turbines 800, waste heat boilers 850, and generators 775, 875 to produce fuel, power, steam and/or energy.

In one or more embodiments, at least a portion of the syngas via line 305 can be introduced to the one or more gas converters 500 to provide one or more Fischer-Tropsch products, chemicals, and/or feedstocks via line ("converted gas line") 510. The converted gas via line 510 can be sold, upgraded, or directed to the one or more hydrogen separators 600 to recover hydrogen therefrom. In one or more embodiments, at least a portion of the syngas via line 305 can bypass the one or more gas converters 500, and can be fed directly to the one or more hydrogen separators 600. In one or more embodiments, at least a portion of the syngas via line 305 can be fed directly to the turbines 700, 800 for the production of power and/or steam.

The Fischer-Tropsch ("F-T") reaction can be carried out in any type of reactor, e.g., fixed bed, moving bed, fluidized bed, slurry, bubbling bed, etc using copper, ruthenium, iron or cobalt based catalysts, or combination thereof, under conditions ranging from about 190° C. to about 450° C. depending on the reactor configuration. Additional reaction and catalyst details can be found in U.S. Patent Application No. 20050284797 and U.S. Pat. Nos. 5,621,155; 6,682,711; 6,331,575; 6,313,062; 6,284,807; 6,136,868; 4,568,663; 4,663,305; 5,348,982; 6,319,960; 6,124,367; 6,087,405; 5,945,459; 4,992,406; 6,117,814; 5,545,674 and 6,300,268.

The one or more Fischer-Tropsch ("F-T") products and/or feedstocks can include, but are not limited to, refinery/petrochemical feedstocks, transportation fuels, synthetic crude oil, liquid fuels, lubricants, alpha olefins, and waxes. Certain products, for instance C4 and C5 hydrocarbons, can be high quality paraffin solvents which, if desired, can be hydrotreated to remove olefin impurities, or employed without hydrotreating to produce a wide variety of wax products. C16+ liquid hydrocarbon products can be upgraded by various hydroconversion reactions, e.g., hydrocracking, hydroisomerization catalytic dewaxing, isodewaxing, etc. or combinations thereof, to produce mid-distillates, diesel and jet fuels such as low freeze point jet fuel, high cetane jet fuel, etc. isoparaffinic solvents, lubricants, e.g., lube oil blending components and lube oil base stocks suitable for transportation vehicles, non-toxic drilling oils suitable for use in drilling muds, technical and medicinal grade white oil, chemical raw materials, and various specialty products.

In at least one specific embodiment, at least one of the one or more gas converters 500 can include one or more slurry bubble column reactors to produce one or more F-T products. The slurry bubble column reactors can operate at a temperature of less than 220° C. and from about 10 to about 600 psia, or about 250 to about 350 psia using a cobalt catalyst promoted with rhenium and supported on titania having a Re:Co weight ratio in the range of about 0.01 to about 1 and containing from about 2% wt to about 50% wt cobalt. In one or more embodiments, the catalyst within the slurry bubble column reactors can include, but is not limited to, a titania support impregnated with a salt of a catalytic copper or an Iron Group metal, a polyol or polyhydric alcohol and, optionally, a rhenium compound or salt. Examples of polyols or polyhydric alcohols include glycol, glycerol, derythritol, threitol, ribitol arabinitol, xylitol, allitol, dulcitol, gluciotol, sorbitol, and mannitol. The catalytic metal, copper or Iron Group metal as a concentrated aqueous salt solution, for example cobalt nitrate or cobalt acetate, can be combined with the polyol and optionally perrhenic acid while adjusting the amount of water to obtain 15 wt % cobalt in the solution and using optionally incipient wetness techniques to impregnate the catalyst onto rutile or anatase titania support, optionally spray-dried and calcined. This method reduces the need for rhenium promoter. Additional details can be found in U.S. Pat. Nos. 5,075,269 and 6,331,575.

In one or more embodiments, at least one of the one or more gas converters 500 can be used to produce methanol, alkyl formates, dimethyl ether, ammonia, acetic anhydride, acetic acid, methyl acetate, acetate esters, vinyl acetate and polymers, ketenes, formaldehyde, dimethyl ether, olefins, derivatives thereof, and/or combinations thereof. For methanol production, for example, the Liquid Phase Methanol Process can be used (LPMEOH™). In this process, the carbon monoxide in the syngas in line 305 can be directly converted into methanol using a slurry bubble column reactor and catalyst in an inert hydrocarbon oil reaction medium which can conserve heat of reaction while idling during off-peak periods for a substantial amount of time while maintaining good catalyst activity. Additional details can be found in U.S. Patent Application No. 2006/0149423 and prior published Heydorn, E. C., Street, B. T., and Kornosky, R. M., "Liquid Phase Methanol (LPMEOH™) Project Operational Experience," (Presented at the Gasification Technology Council Meeting in San Francisco on Oct. 4-7, 1998). Gas phase processes for producing methanol can also be used. For example, known processed using copper based catalysts, the Imperial Chemical Industries process, the Lurgi process and the Mitsubishi process can be used.

For ammonia production, at least one of the one or more gas converters 500 can be adapted to operate the Haber-Bosch process described in LeBanc et al in "Ammonia," Kirk-Othmer Encyclopedia of Chemical Technology, Volume 2, 3rd Edition, 1978, pp., 494-500. For alkyl formate production, such as for example, methyl formate, any of several processes wherein carbon monoxide and methanol are reacted in either the liquid or gaseous phase in the presence of an alkaline catalyst or alkali or alkaline earth metal methoxide catalyst can be used. Additional details can be found in U.S. Pat. Nos. 3,716,619; 3,816,513; and 4,216,339.

The one or more hydrogen separators 600 can include any system or device to selectively separate hydrogen from syngas to provide one or more purified hydrogen streams and one or more waste gas streams. In one or more embodiments, the hydrogen separators 600 can utilize pressure swing absorption, cryogenic distillation, and semi-permeable membranes. Suitable absorbents can include caustic soda, potassium carbonate or other inorganic bases, and/or alkanolamines.

In one or more embodiments, the hydrogen separators 600 can provide a carbon dioxide rich stream via line 605, and a hydrogen rich stream via line 615. In one or more embodiments, at least a portion of the hydrogen rich stream via line 615 can be used as a feedstock to one or more fuel cells 650. In one or more embodiments, at least a portion of the hydrogen rich stream via line 615 can be combined with the syngas via line 305 prior to use as a fuel in the one or more combustors 750.

In one or more embodiments, the carbon dioxide rich stream via line 605 can be used in a fuel recovery process to enhance the recovery of oil and gas as described above. Although not shown, the carbon dioxide rich stream via line 605 can be combined with the recovered carbon dioxide from the conversion unit 120.

In one or more embodiments, at least a portion of the syngas via line 305 can be combusted in one or more combustors 750 to provide a high pressure/high temperature exhaust gas stream 720. In one or more embodiments, the exhaust gas stream 720 can be introduced to one or more combustion turbines 700 to provide an exhaust gas stream 810 and mechanical shaft power to drive the one or more electric generators 775. The exhaust gas stream 810 can be introduced to one or more heat recovery systems 850 to provide steam via stream 820. A first portion of the steam in stream 820 can be introduced to one or more steam turbines 800 to provide mechanical shaft power to drive one or more electric generators 875. In one or more embodiments, a second portion of the steam within stream 820 can be introduced to the gasifier 200, and/or other auxiliary process equipment (not shown). In one or more embodiments, lower pressure steam from the one or more steam turbines 800 can be recycled to the one or more heat recovery systems 850 via stream 830. Although not shown, ambient air via stream 705 can be drawn into the combustion turbine 730 to provide compressed air directly to the gasifier 105 of either system 100 or 200.

In one or more embodiments, any of the systems 100, 200, 300 described can include one or more air separation units ("ASU") 900 for the production of essentially nitrogen-free synthesis gas, if desired. Any air separation unit can be used including membrane type and cryogenic separation types. The ASU 900 can convert air via line 905 to provide a nitrogen-lean/oxygen rich gas via line 910 ("oxygen gas") and a nitrogen rich/oxygen lean gas via line 915 ("nitrogen gas"). The oxygen gas via line 910 can be supplied to the gasifiers 105 (see FIGS. 1 and 2) within the system 100 and/or 200. The use of a nearly pure oxygen allows the gasifier(s) 105 to produce a syngas that is essentially nitrogen-free, e.g. containing less than 0.5% nitrogen/argon.

The nitrogen gas via line 915 from the ASU 900 can be used for utility purposes. Although not shown, the separated nitrogen via line 915 can be purged and/or returned to the one or more combustion turbines 730 to reduce NOx emissions by lowering the combustion temperature in the combustion turbine 730. The nitrogen acts as a diluent with no heating value, i.e. a heat sink. To further minimize NOx formation, the syngas stream 413 entering the combustion turbine(s) 730 can be saturated with water.

Certain embodiments can further include processes for producing syngas, comprising: converting at least a portion of carbon monoxide in a syngas to carbon dioxide to provide a shifted syngas and condensed water, the syngas having a first hydrogen to carbon monoxide ratio and a first temperature, wherein the shifted syngas has a second hydrogen to carbon monoxide ratio and a second temperature, both greater than the first; at least partially transferring heat from the shifted syngas to the condensed water to at least partially vaporize the condensed water; and at least partially saturating the syngas with the at least partially vaporized condensed water, wherein a ratio of the water vapor to syngas is less than 1.0.

The embodiments for processes for producing syngas described in Paragraph [00072] can further include one or more of the following: wherein the ratio of the water vapor to syngas is less than 0.9; removing one or more acid gases from the shifted syngas; removing one or more sour gases from the condensed water prior to at least partially saturating the syngas; and/or removing one or more sour gases from the condensed water prior to at least partially saturating the syngas and gasifying the removed sour gases for disposal.

Certain embodiments can further include processes for producing syngas, comprising: splitting a syngas to provide at least a first portion and a second portion; adding water to the first portion to provide an at least partially saturated syngas having a water vapor to syngas ratio less than 1.0; converting at least a portion of carbon monoxide in the at least partially saturated syngas to carbon dioxide to provide a shifted syngas and condensed water, the first portion of syngas having a first hydrogen to carbon monoxide ratio and a first temperature, and the shifted syngas having a second hydrogen to carbon monoxide ratio and a second temperature, both greater than the first; at least partially vaporizing the condensed water; at least partially saturating the syngas with the at least partially vaporized condensed water; and combining the shifted syngas with the second portion to provide a product gas.

The embodiments for processes for producing syngas described in Paragraph [00074] can further include one or more of the following: wherein the product gas has a hydrogen to carbon monoxide ratio of 2:1 or less; wherein the product gas has hydrogen to carbon monoxide ratio of 2:1 or more; wherein at least partially vaporizing the condensed water comprises heating the condensed water with indirect heat exchange from the shifted syngas; wherein at least partially vaporizing the condensed water comprises heating the condensed water with indirect heat exchange from the second portion of syngas; wherein heating the condensed water with indirect heat exchange from the second portion of syngas condenses water from the syngas, wherein the condensed water is used to at least partially saturate the first portion of syngas; cooling the second portion of the syngas to condense water therefrom and using the condensed water to at least partially saturate the first portion of syngas; removing the carbon dioxide from the product gas; wherein the first portion of the syngas has a hydrogen to carbon monoxide ratio less than 1:1; wherein the split of the syngas to the first portion and the second portion is pre-determined based upon the desired hydrogen to carbon monoxide ratio in the product gas; wherein the first portion comprises 10 vol % to 99 vol % of the syngas; wherein the first portion comprises 15 vol % to 60 vol % of the syngas; condensing water from the product gas and using the condensed water to at least partially saturate the first portion of syngas; combining the condensed water from the product gas with the condensed water from the second portion of the syngas, selectively removing one or more contaminants from the combined condensate, and returning at least a portion of the combined condensate to the first portion of the syngas; and/or recycling the one or more removed contaminants to a hydrocarbon gasifier for the production of additional syngas.

Certain embodiments can further include processes for producing syngas comprising: gasifying one or more carbonaceous feedstocks at conditions sufficient to provide a syngas having a first hydrogen to carbon monoxide ratio; splitting the syngas to provide at least a first portion and a second portion; adding water to the first portion to provide an at least partially saturated syngas having a water vapor to syngas ratio less than 1.0; converting at least a portion of carbon monoxide in the at least partially saturated syngas to carbon dioxide to provide condensed water and a shifted syngas enriched in hydrogen; at least partially vaporizing the condensed water using heat from the conversion step or heat from the second portion of the syngas or both; at least partially saturating the first portion of the syngas with the at least partially vaporized condensed water condensed water; and combining the shifted syngas with the second portion of the syngas to provide a product gas containing a hydrogen to carbon monoxide ratio greater than the first.

The embodiments for processes for producing syngas described in Paragraph [00076] can further include comprising removing one or more sour gases from the condensed water and recycling the one or more removed sour gases to the gasifying step.

Certain embodiments can further include systems for producing syngas comprising: means for gasifying a carbonaceous material to provide a syngas having a first hydrogen to carbon monoxide ratio; means for saturating the syngas with water to provide a syngas having a relative humidity of at least 70%; means for converting carbon monoxide in the syngas having a relative humidity of at least 70% to carbon dioxide to provide a shifted syngas having a second hydrogen to carbon monoxide ratio and a second temperature; means for at least partially transferring heat from the shifted syngas to a heat transfer medium; and means for preheating the syngas by heat exchange with the heated heat transfer medium.

The embodiments for processes for producing syngas described in Paragraph [00078] can further include one or more of the following: means for condensing water from the shifted syngas; and/or means for condensing water from the shifted syngas and means for selectively removing one or more contaminants from the condensed water.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A process for producing syngas, comprising the steps of:
   splitting a syngas to provide at least a first portion of syngas and a second portion of syngas;
   adding water to the first portion of syngas to provide an at least partially saturated syngas having a water vapor to syngas ratio less than 1.0;
   converting at least a portion of carbon monoxide in the at least partially saturated syngas to carbon dioxide to provide a shifted syngas, the first portion of syngas having a first hydrogen to carbon monoxide ratio and a first temperature, and the shifted syngas having a second hydrogen to carbon monoxide ratio and a second temperature, both greater than the first;
   separating a condensed water from the shifted syngas;
   at least partially vaporizing the condensed water;
   separating one or more contaminants from the at least partially vaporized condensed water to produce a contaminant-lean water, wherein the contaminant-lean water contains less contaminants than the at least partially vaporized condensed water;
   at least partially saturating the first portion of syngas with the contaminant-lean water;
   gasifying the one or more separated contaminants to produce additional syngas; and
   combining the shifted syngas with the second portion of syngas to provide a product gas.

2. The process of claim 1, wherein the product gas has a hydrogen to carbon monoxide ratio of 2:1 or less.

3. The process of claim 1, wherein the product gas has a hydrogen to carbon monoxide ratio of 2:1 or more.

4. The process of claim 1, wherein at least partially vaporizing the condensed water comprises heating the condensed water with indirect heat exchange from the shifted syngas.

5. The process of claim 1, wherein at least partially vaporizing the condensed water comprises heating the condensed water with indirect heat exchange from the second portion of syngas.

6. The process of claim 5, wherein heating the condensed water with indirect heat exchange from the second portion of syngas condenses water from the second portion of syngas, wherein the condensed water is used to at least partially saturate the first portion of syngas.

7. The process of claim 1, wherein the one or more contaminants comprise hydrogen sulfide, hydrogen cyanide, hydrogen chloride, ammonia, or any combination thereof.

8. The process of claim 1, further comprising cooling the second portion of the syngas to condense water therefrom and using the condensed water to at least partially saturate the first portion of syngas.

9. The process of claim 1, further comprising removing the carbon dioxide from the product gas.

10. The process of claim 1, wherein the first portion of the syngas has a hydrogen to carbon monoxide ratio less than 1:1.

11. The process of claim 1, wherein the split of the syngas to the first portion of syngas and the second portion of syngas is pre-determined based upon the desired hydrogen to carbon monoxide ratio in the product gas.

12. The process of claim 1, wherein the first portion of syngas comprises 10 vol % to 99 vol % of the syngas.

13. The process of claim 1, wherein the first portion of syngas comprises 15 vol % to 60 vol % of the syngas.

14. The process of claim 1, further comprising condensing water from the product gas and using the condensed water to at least partially saturate the first portion of syngas.

15. The process of claim 1, wherein the at least partially saturated syngas has a water vapor to syngas ratio of 0.6 or less.

16. A process for producing syngas, comprising the steps of:
    gasifying one or more carbonaceous feedstocks at conditions sufficient to provide a syngas having a first hydrogen to carbon monoxide ratio;
    splitting the syngas to provide at least a first portion of syngas and a second portion of syngas;
    adding water to the first portion to provide an at least partially saturated syngas having a water vapor to syngas ratio less than 1.0;
    converting at least a portion of carbon monoxide in the at least partially saturated syngas to carbon dioxide to provide condensed water and a shifted syngas, the first portion of syngas having the first hydrogen to carbon monoxide ratio and a first temperature, and the shifted syngas having a second hydrogen to carbon monoxide ratio and a second temperature, both greater than the first;
    at least partially vaporizing the condensed water using heat from the conversion step or heat from the second portion of the syngas or both;

separating one or more contaminants from the at least partially vaporized condensed water to produce a contaminant-lean water;

at least partially saturating the first portion of the syngas with the contaminant-lean water;

gasifying the one or more separated contaminants to produce additional syngas; and combining the shifted syngas with the second portion of the syngas to provide a product gas containing a hydrogen to carbon monoxide ratio greater than the first.

17. The process of claim 16, wherein the one or more contaminants comprise one or more sour gases.

18. A process for producing syngas, comprising:

splitting a syngas to provide at least a first portion of syngas and a second portion of syngas;

adding water to the first portion of syngas to provide an at least partially saturated syngas having a water vapor to syngas ratio less than 1.0;

converting at least a portion of carbon monoxide in the at least partially saturated syngas to carbon dioxide to provide a shifted syngas and condensed water, the first portion of syngas having a first hydrogen to carbon monoxide ratio and a first temperature, and the shifted syngas having a second hydrogen to carbon monoxide ratio and a second temperature, both greater than the first;

at least partially vaporizing the condensed water by heating the condensed water with indirect heat exchange from the second portion of syngas, and wherein heating the condensed water with indirect heat exchange from the second portion of syngas condenses water from the second portion of syngas;

combining the condensed water produced by converting at least a portion of the carbon monoxide in the at least partially saturated syngas with the condensed water from the second portion of the syngas;

selectively removing one or more contaminants from the combined condensate;

returning at least a portion of the combined condensate to the first portion of the syngas;

combining the shifted syngas with the second portion of syngas to provide a product gas; and recycling the one or more removed contaminants to a hydrocarbon gasifier for the production of additional syngas.

19. The process of claim 18, wherein the one or more contaminants comprise hydrogen sulfide, hydrogen cyanide, hydrogen chloride, ammonia, or any combination thereof.

20. The process of claim 18, wherein the product gas has a hydrogen to carbon monoxide ratio of 2:1 or less.

* * * * *